(12) United States Patent
Boyd et al.

(10) Patent No.: US 6,449,439 B1
(45) Date of Patent: Sep. 10, 2002

(54) UNITARY LIGHT DIFFUSING CAVITY

(75) Inventors: Gary T. Boyd, Woodbury; Richard A. Miller, Stillwater, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/451,313

(22) Filed: Nov. 30, 1999

(51) Int. Cl.$^7$ .................. G03B 13/02; G02B 13/20; F21V 5/00; H04N 5/22; G02F 1/1335
(52) U.S. Cl. .................. 396/374; 359/599; 362/558; 362/327; 348/333.01; 349/64; 349/67
(58) Field of Search ................. 396/374, 385, 396/373; 348/333.01, 333.09; 353/67; 359/630, 599; 362/3, 16, 558, 559, 560, 582, 326, 327; 349/64, 67, 62

(56) References Cited

U.S. PATENT DOCUMENTS

| | | | |
|---|---|---|---|
| 5,517,278 A | * 5/1996 | Takahara et al. | 396/374 |
| 5,555,329 A | * 9/1996 | Kuper et al. | 359/630 |
| 5,610,678 A | * 3/1997 | Tsuboi et al. | 396/373 |
| 5,808,800 A | 9/1998 | Handschy et al. | 359/630 |
| 5,868,480 A | * 2/1999 | Zeinali | 353/31 |
| 5,984,477 A | * 11/1999 | Weissman et al. | 359/630 |
| 6,111,618 A | * 8/2000 | Booth et al. | 349/5 |
| 6,313,892 B2 | * 11/2001 | Gleckman | 349/65 |

FOREIGN PATENT DOCUMENTS

WO  99/34246  7/1999

* cited by examiner

Primary Examiner—Christopher Mahoney
(74) Attorney, Agent, or Firm—William D. Miller

(57) ABSTRACT

A cavity diffuses light received from a light source so as to produce a uniform light output. The cavity is formed from a unitary structure having one or more portions that diffusely reflect light within the cavity and another portion that transmits the uniform light output. The cavity is a unitary structure, formed from an optically diffusive material, that defines a diffusing cavity having an access aperture. A portion of the unitary structure defines diffusely reflective walls and another portion of the unitary structure defines a diffusely transmitting screen. A portion of the diffusely reflecting walls has a portion that has a thickness being greater than a thickness of the diffusely transmitting screen. The diffusely reflective walls reflect and mix light within the diffusing cavity. The diffusing cavity may be employed in an illuminated display device, having a light source and an imaging device which imposes an image on light received from the cavity.

32 Claims, 5 Drawing Sheets

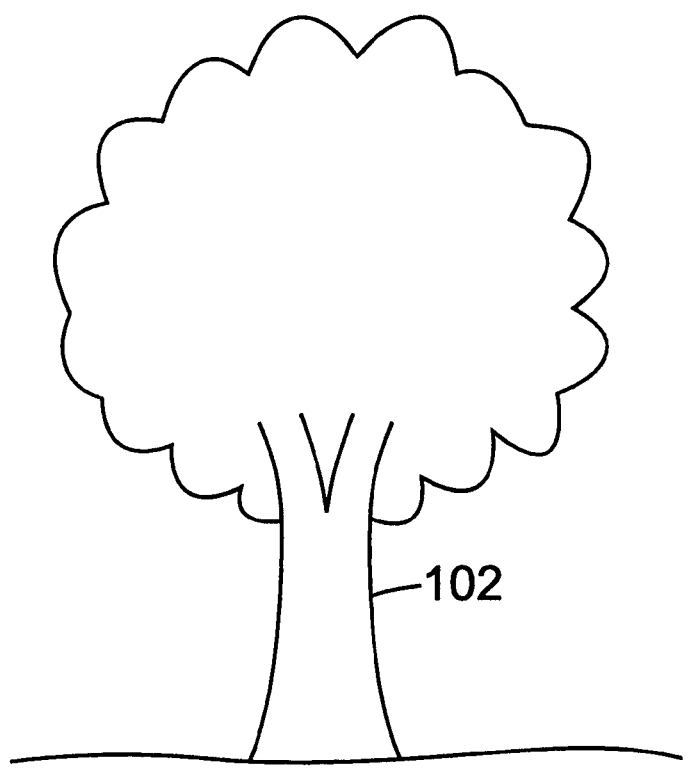
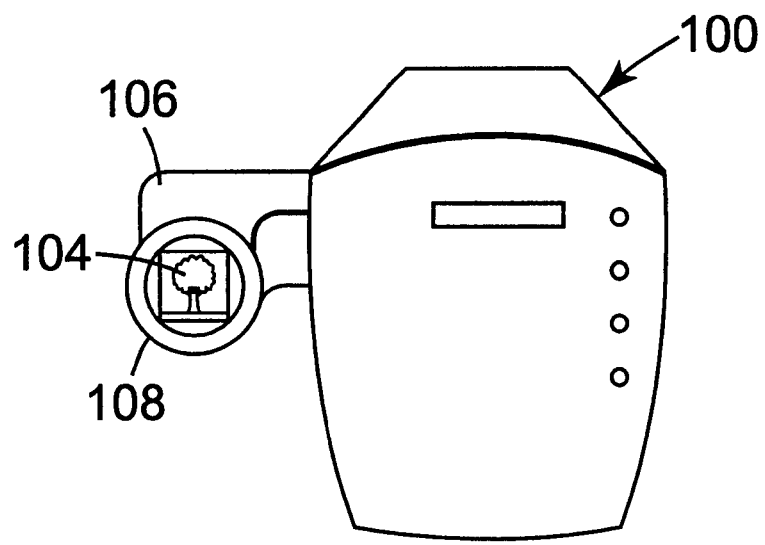
*Fig. 1*

US 6,449,439 B1

UNITARY LIGHT DIFFUSING CAVITY

FIELD OF THE INVENTION

The invention relates to light sources, and more particularly to light sources requiring a substantially uniform illumination area.

BACKGROUND

Many optical devices, such as indicators on a car's dashboard, microdisplays in electronic cameras and other types of display, require illumination by a beam of light having relatively uniform brightness. However, most light sources, such as incandescent lights, arc lamps, and light emitting diodes, provide a nonuniform light output that is unsuitable for direct use.

One approach to uniformizing the light produced by the light source is to couple the light from the light source into a light diffusing cavity. The light diffusing cavity typically has diffusely reflecting walls, which results in diffusing and mixing the light from the light source. The light exits the cavity through a transmitting surface with a substantially uniform brightness.

A common approach to forming a diffusing cavity is to use a metallic parabola, or cavity, whose inner surface is coated with a reflective metal or white diffuse material. A transmitting film is attached to the output from the parabola, or cavity, as the transmitting surface. Coating the metallic component and attaching the transmitting film is labor intensive process, and requires a particularly high level of skill and equipment where the metallic cavity and transmitting film are only a few millimeters in size, as is typical with microdisplays.

Therefore, there is a need for an improved diffusing cavity which reduces the time and effort required for assembly.

SUMMARY OF THE INVENTION

Generally, the present invention relates to a cavity for diffusing light from a light source so as to produce a uniform light output. The cavity is formed from a unitary structure having one or more portions that diffusely reflect light within the cavity and another portion that transmits the uniform light output.

One particular embodiment of the invention is a unitary structure, formed from an optically diffusive material, that defines a diffusing cavity having an access aperture. A portion of the unitary structure defines diffusely reflective walls and another portion of the unitary structure defines a diffusely transmitting screen. A portion of the diffusely reflecting walls has a portion that has a thickness being greater than a thickness of the diffusely transmitting screen.

In another embodiment of the invention, a light diffusing device includes a unitary structure formed from an optically diffusive material. The unitary structure defines a diffusing cavity having an access aperture. A first portion of the unitary structure substantially diffusely reflects and mixes light within the diffusing cavity. A second portion of the unitary structure substantially diffusely transmits light from the diffusing cavity as a light output.

Another embodiment of the invention is an illuminated display device, which includes a light source and a light diffuser. The light diffuser is formed from a first material and defines diffusely reflecting walls and a diffusely transmitting screen. The diffusely reflecting walls and transmitting screen are formed as a unitary body and define a diffuser cavity having an access aperture. A wall thickness is greater than a transmitting screen thickness. Light from the light source is diffusely reflected within the cavity and is diffusely transmitted through the transmitting screen to illuminate an imaging device which imposes an image on light received from the light diffuser.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 illustrates a schematic of a camera having an electronic viewfinder;

Figure 2:
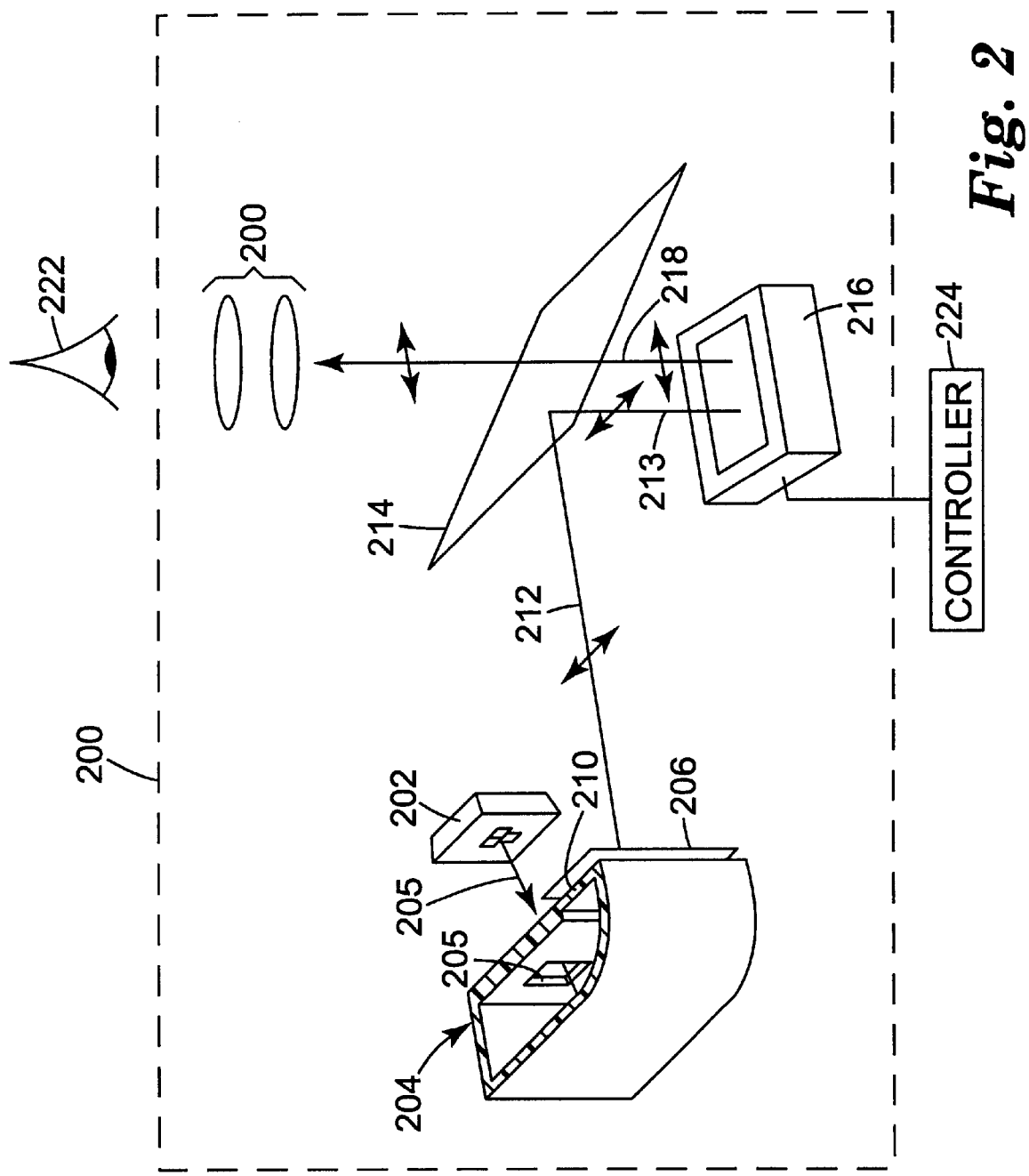
FIG. 2 schematically illustrates the viewfinder for the camera of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical illumination sources and is believed to be particularly useful for illumination sources that require a generally uniform output over a specified illumination area. One of the advantages of the invention is that it is manufacturable as a single, unitary diffusing cavity, thus producing savings in the manufacturing costs. Furthermore, the unitary diffusing cavity reduces the labor required to assemble a system incorporating the illumination source.

One particular application for a light source having a uniformly bright output is in illuminating a microdisplay such as may be found, for example, in a viewfinder of an electronic camera. Electronic cameras include video cameras and digital cameras, and any other device that converts an optical image to electronic form. For example, a video camera 100, as illustrated in FIG. 1, records an image of an object 102. The user views an image 104 of the object 102 through a viewfinder 106 by placing his or her eye close to the viewing aperture 108.

Microdisplays may also be used elsewhere, for example in head-mounted displays such as DVD viewers, virtual reality goggles and heads-up displays.

An exploded view of one particular embodiment of a microdisplay 200 is illustrated in schematic form in FIG. 2. The microdisplay 200 includes a light source 202 that feeds light 208 into a diffuser 204. A polarizer 206 polarizes the light 212 emitted from the diffuser 204. The light 212 transmitted through the output screen 210 of the diffuser 204 and through the polarizer 206 is more uniform in brightness than the light 208 entering the diffuser 204 from the light source 202.

The light 212 transmitted through the polarizer 206 is incident on a polarizing beamsplitter 214 which reflects light of a first polarization and transmits light of a second polarization orthogonal to the first polarization. The beamsplitter 214 is positioned to reflect the light 213 to an imaging device 216. The imaging device 216 spatially modulates the incident light 213 to create an image. The imaging device 216 may modulate the incident light 213 by rotating the polarization of certain portions of the incident light 213, so that some of the light 218 reflected back towards the polarizing beamsplitter 214 is transmitted and propagated via coupling optics 220 to the user's eye 222. The imaging device 216 receives instructions from a controller 224. Where the microdisplay 200 is used in a camera, the controller 224 may be part of the control electronics of the camera.

The light source 202 may be any type of compact, efficient light source, such as an incandescent light, and arc lamp, or a solid state light source, such as a light emitting diode (LED). One or more LEDs may be used as the light source. If it is desired that the user perceive that the imaging device has been illuminated by white light, then a combination of differently colored LEDs, for example red, green and blue, may be used as the light source 202. The light source 202 may be closely coupled to the cavity aperture 205 to increase the fraction of the emitted light 208 that enters the diffuser 204. The light source 202 may be partially or wholly located within the diffuser 204, or may be located outside the diffuser. The cavity aperture 205 may be very small, for example just large enough to receive a wire to carry power into a light source 202 located within the diffuser, or to receive a fiber that carries light from a light source 202 into the diffuser 204.

The polarizer 206 is typically used where the imaging device 216 is polarization dependent, to ensure that light of only one polarization reaches the imaging device 216. The polarizer 206 may be molded on to the output screen 210 of the diffuser 204. The polarizer 206 may also be positioned between the light source 202 and the diffuser 204, although this generally results in a loss of efficiency due to depolarization in the diffuser 204.

The polarizer 206 may be any suitable type of polarizer, for example a dichroic polarizer, or a reflective polarizer such as a multilayer polarizer, a wire grid polarizer. The polarizer 206 may also be a circular polarizer, such as a cholesteric polarizer, used in combination with a quarter wave retarder to produce linearly polarized light. Where the imaging device 216 modulates circularly polarized light, the polarizer 206 may be a circular polarizer, such as a cholesteric polarizer used without a retarding layer.

The polarizer 206 may be omitted if the polarizing beamsplitter 214 is capable of producing a sufficiently high polarization contrast in the reflected light 213 directed to the imaging device 216. An imaging device 216 that is based on a liquid crystal display (LCD) typically requires illumination by light having a polarization contrast ratio in excess of 20:1, and preferably in excess of 100:1. Illumination by light having a lower polarization contrast ratio generally results in a reduction of the quality of the image seen by the user, particularly a reduction in image contrast and image resolution.

The polarizing beamsplitter 214 is disposed to reflect the light 212 from the diffuser 204 towards the imaging device 216, shown as light beam 213. The polarizing beamsplitter 214 is particularly useful for separating the light 213 incident on the imaging device 216 from the light 218 reflected from the imaging device 216.

The reflecting beamsplitter 214 may be any type of suitable reflecting polarizer, for example a multilayer polarizer, a wire grid polarizer or a cholesteric polarizer. If a cholesteric polarizer is used, quarter wave retarding layers may be employed to convert linearly polarized light to circularly polarized light, and vice-versa, if the imaging device 216 operates on linearly polarized light. If the imaging device 216 operates on circularly polarized light, such as a cholesteric liquid crystal display, the reflecting beamsplitter 216 and the polarizer 206 may both be cholesteric elements, and the light propagating within the microdisplay 200, following the polarizer 206, is largely circularly polarized.

It will be appreciated that the polarizing beamsplitter may, in certain geometries, be omitted. For example, where the imaging device 216 transmits the image, rather than reflecting the image, the light 212 transmitted by the diffuser 204 may illuminate the imaging device 216 directly. If the imaging device 216 relies on the incident light being polarized, then a polarizer may be interposed between the diffuser 204 and the imaging device 216.

The imaging device 216 modulates the incident light 213 to produce the image seen by the user. The imaging device 216 may be a liquid crystal display (LCD). For a microdisplay, the imaging device is typically small, with the active area of only a few $mm^2$.

In addition to being a reflective display, the imaging device 216 may be a transmissive display, for example a transmissive LCD imaging device, so that the viewer views light that is transmitted through the imaging device 216. The imaging device 216 is not restricted to operating by polarization modulation. For example, the imaging device may be an array of individually movable miniature mirrors, such as the Digital Micromirror Device™ produced by Texas Instruments, or may be based on the use of so-called "electronic paper", such as an electrophoretic display manufactured by E-Tek Inc., or a gyricon-based display manufactured by Xerox Corp. Other types of imaging device may also be used. It will be appreciated that the optical arrangement of the microdisplay is dependent on the type of imaging device employed, and need not be identical to that illustrated in FIG. 2. However, the diffuser 204 is useful whenever the imaging device 216 is to be uniformly illuminated.

Figure 3:
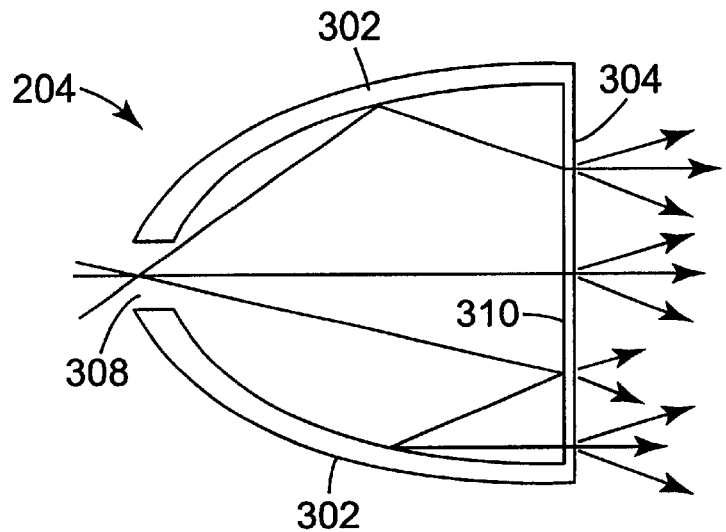
FIG. 3 schematically illustrates a cross-section through a unitary diffusing cavity according to a first embodiment of the invention.

The diffuser 204, illustrated in more detail in FIG. 3, has reflecting walls 302 and a transmitting screen 304 that form a diffusing cavity 306. Light enters the diffuser 204 through an aperture 308. The walls 302 diffusely reflect light within the cavity 306. The transmitting screen 304 diffusely transmits light, as well as diffusely reflecting a portion of light incident on its inside surface 310. The cavity shape may be optimized to collect light from the light source 202 and direct the light towards the transmitting screen 304, as well as to reflect light reflected by the transmitting screen 304 back to the transmitting screen 304. The diffuser 204 may be formed in a "cup" shape, for example where the inner surface of the walls 302 form a parabolic reflector such as may typically be found in a flashlight. It will be appreciated that other geometrical arrangements may also be used.

The walls 302 and the transmitting screen 304 are molded from the same plastic material as a single unitary body. The walls 302 are generally thicker than the transmission screen 304, resulting in diffuse reflection from the walls 302 while permitting light to forward scatter through the transmission screen 304. Therefore, the ratio of wall thickness to transmitting screen thickness is greater than 1:1, for at least a portion of the walls, and is typically greater than 2:1. Improved operation, for example an increased ratio of light transmitted through the transmission screen to light lost in the cavity 306, may be obtained with larger ratios, for example 5:1 or 10:1. It will be appreciated that the walls 302 need not be uniformly thick. The spatial extent of the diffuse illumination produced by the diffuser 204, as well as its uniformity, is dependent to some extent on the length of the cavity 306.

The walls 302 and the transmitting screen 306 may be formed from a plastic or polymer material, having a first refractive index, which is loaded with scattering particles. The scattering particles may be transparent, having a second refractive index different from the first refractive index, for example titanium dioxide ($TiO_2$), teflon (polytetrafluoroethylene), or some other suitable material. The size of the scattering particles may be selected to preferentially scatter light in a certain wavelength range, so as to tailor the spectrum of the light output from the diffuser 204. For example, if the scattering particles are sufficiently small, about 0.15 $\mu$m, the blue end of the spectrum is scattered to a higher degree than the red end of the spectrum. If the walls 302 are sufficiently thick, then both red and blue light are diffusely reflected by the walls 302. If the walls are not sufficiently thick, then those wavelengths that are scattered less may leak from the cavity to a greater degree than those wavelengths that are high scattered. Furthermore, the fraction of red light transmitted by the transmission screen 304 is higher than the fraction of transmitted blue light, and so the output appears to be red.

On the other hand, larger scattering particles, for example in the range from 0.25–0.3 $\mu$m, have a scattering coefficient that is more uniform for wavelengths across the visible spectrum. Consequently, a diffuser incorporating scattering particles in the 0.25–0.3 $\mu$m range typically produces light having a more uniformly white output.

The addition of an absorbing pigment, such as carbon black, to the polymer host material provides further opportunity to control the spectrum of the light output from the diffuser. The reason for this is that the diffuse reflection from the cavity wall 302 is typically the result of many scattering events within the wall material. Since the scattering cross-section is wavelength dependent, some wavelengths take a longer path through the wall material before being back-scattered out of the wall 302. Consequently, these long path-length wavelengths may be absorbed to a greater degree than those wavelengths that have a relatively short path length within the wall material.

In another embodiment, the polymer host material may be impregnated with an absorbing dye having an absorption band at a selected wavelength range. The result is that light within the absorption range is selectively absorbed as the light scatters within the wall 302. Consequently, the light emitted by the diffuser 204 is lacking light in the absorption wavelength range.

The degree to which light is transmitted through the screen 304, and the degree of reflectivity of the walls 302 may be varied by adjusting the loading of the scattering particles in the plastic. The thicknesses of the walls 302 and transmitting screen 304 may also be adjusted to vary the amount of reflection and transmission.

One of the advantages of the unitary diffuser is that it is somewhat insensitive to the amount of loading of the scattering particles. The transmission through the screen varies inversely with the amount of reflection at the walls. Thus, if the loading is increased, the transmission through the screen is decreased. However, this is at least partly compensated by the increased reflectivity in the cavity walls, which increases the circulation of the light within the cavity, and so the probability of the light within the cavity reaching the transmission screen is increased. On the other hand, if the loading is reduced, there is a lower reflectivity within the cavity, and the screen has a concomitantly higher transmission, and so a greater fraction of the light is extracted through the screen.

The size of the diffusing cavity may affect the uniformity of brightness of the light transmitted through the transmitting screen. For example, the closer the transmitting screen is positioned to the light source, the lower the probability that light is scattered by the walls, with the result that the brightness profile of light passing through the transmitting screen more closely approximates the brightness profile of the light beam output by the light source. Therefore, the brightness uniformity of the light output through the transmitting screen is reduced in uniformity. Furthermore, if the light source has more than one emitter, such as a three-color LED source, then the light from the different emitters is less likely to be overlapped and mixed at the transmitting screen. This may lead to a reduction in color uniformity where the different emitters emit different wavelength components of light.

On the other hand, as the separation between the light source and the transmitting screen is increased, the light beams from each of the emitters overlap to a greater degree, and there is an increased probability of diffusion from the sidewalls. Consequently, the light output from the transmitting screen is more uniform in brightness and in color. However, if the transmitting screen is positioned too far from the light source, the overall brightness may be reduced due to increased losses within the cavity that result from the increased path length between the light source and the transmitting screen.

Figure 4:
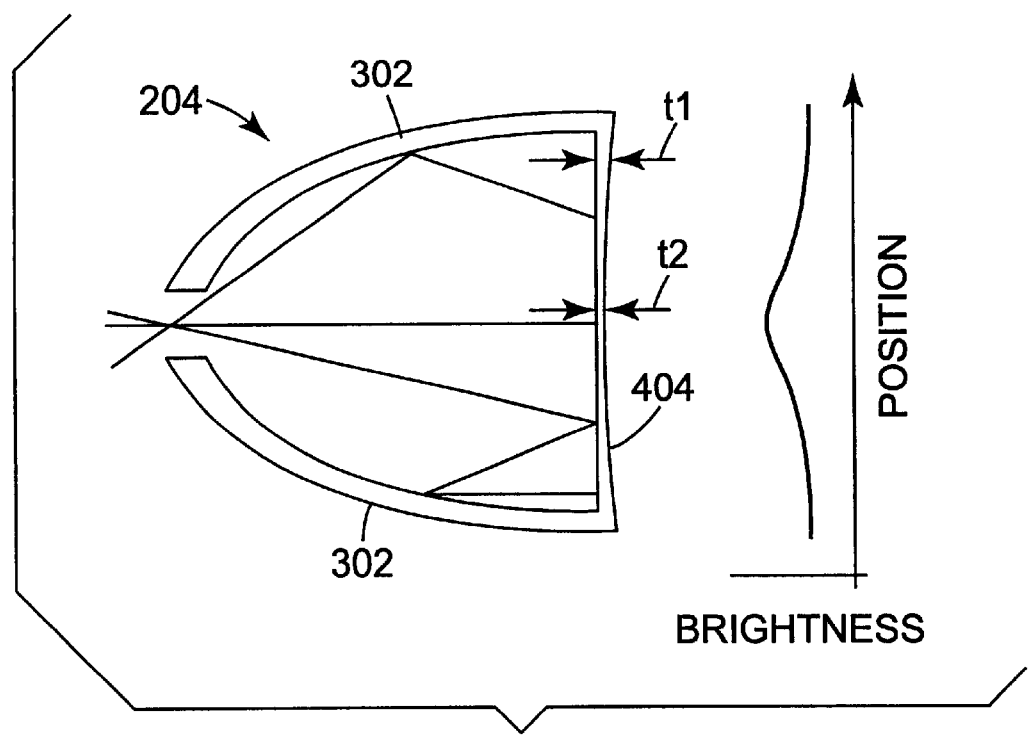
FIG. 4 schematically illustrates a unitary diffusing cavity according to a second embodiment of the invention.
Figure 5:
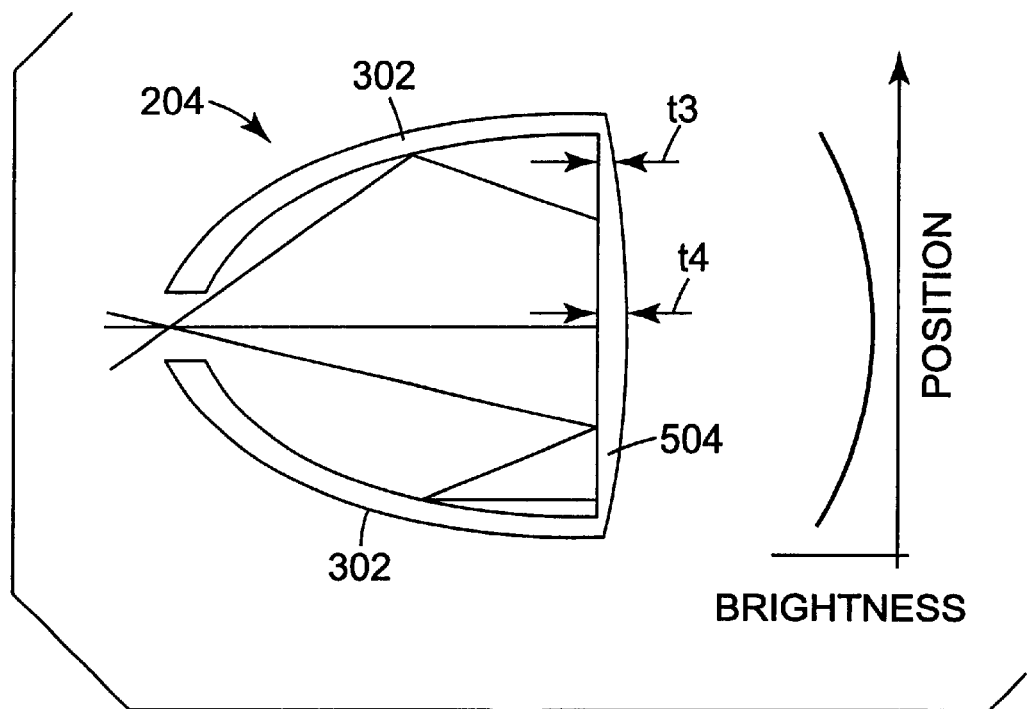
FIG. 5 schematically illustrates a unitary diffusing cavity according to a third embodiment of the invention.

The brightness profile of the light output from the transmission screen 304 may be adjusted by varying the thickness of the screen 304 film over its area: more light is transmitted at areas of lesser thickness and less light is transmitted at areas of greater thickness. One example of a transmission screen having a non-uniform thickness is illustrated in FIG. 4. The transmission screen 404 has a thickness t1 closer to the edge of the screen 404 and a thickness t2 close to the center of the screen 404, with t2<t1. Thus, more light is transmitted through the center of the screen 404 than its edge, as illustrated in the accompanying brightness profile. Another example of a nonuniformly thick transmission screen 504 is illustrated in FIG. 5, where the thickness, t3, at the edge of the screen 504 is less than the thickness, t4, at the center of the screen, as illustrated in the accompanying brightness profile. Spatial variations in the thickness of the transmission screen may provide advantages of improving the uniformity of light transmitted, or may permit the concentration of light in a desired spatial region.

Figure 6:
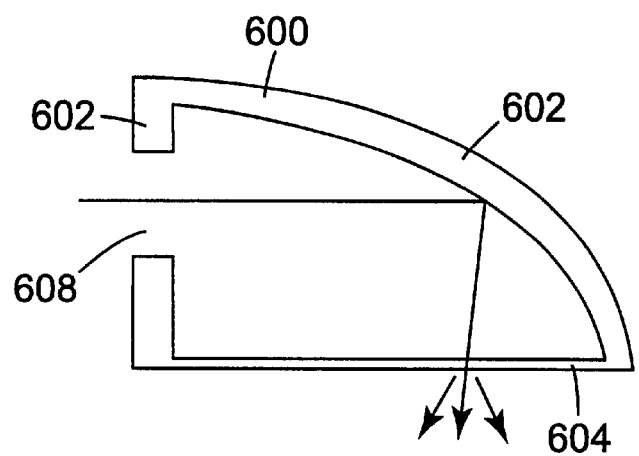
FIG. 6 schematically illustrates a unitary diffusing cavity according to a fourth embodiment of the invention.

Another embodiment of a diffuser 600 is illustrated in FIG. 6. The diffuser 600 has reflecting walls 602 and a transmission screen 604. Light 610 enters the diffuser through the aperture 608 generally in a direction parallel to the transmission screen, and is deflected by the walls 602 towards the screen 604.

Figure 7:
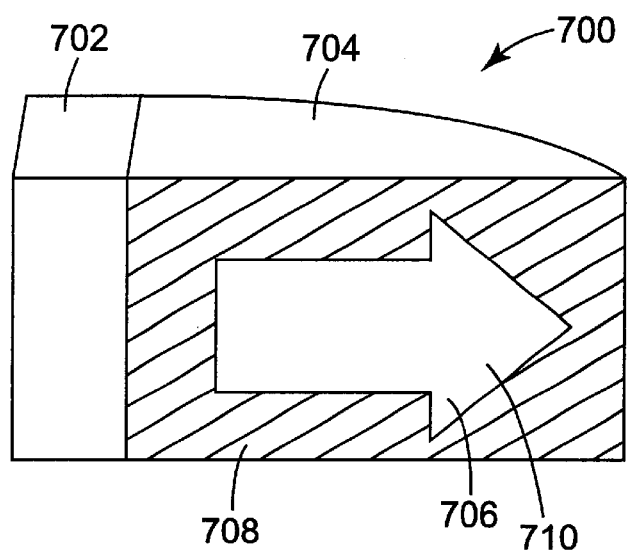
FIG. 7 illustrates a unitary diffusing cavity having a patterned output screen.

The diffuser may be used for illumination purposes other than illuminating a microdisplay. For example, the diffuser may be used for producing a relatively uniformly bright light source for indicators, such as a dash-board indicator in a car. For example, the indicator 700 illustrated in FIG. 7 has a light source in a light source housing 702 which is coupled to pass light into the diffuser 704. The transmission screen 706 is provided with a masked portion 708 that outlines a shaped transmitting region 710 on the transmission screen 706. In the case illustrated, the transmitting region 710 is shaped as an arrow, such as may be used as an indicator light on a dashboard.

The masked portion 708 may have some masking material on a surface to prevent the passage of light through the masked portions of the screen 706. Also, the masked portion 708 may be provided by an area of the screen 706.that is significantly thicker, and thus transmits less light, than the transmitting shape 710. This latter option provides an advantage in that light incident on the inner surface of the screen 706 at the masked portion 708 is reflected back into the diffuser cavity, and may be recirculated within the cavity to emerge through the transmitting portion 710, thus increasing the efficiency.

Figure 8:
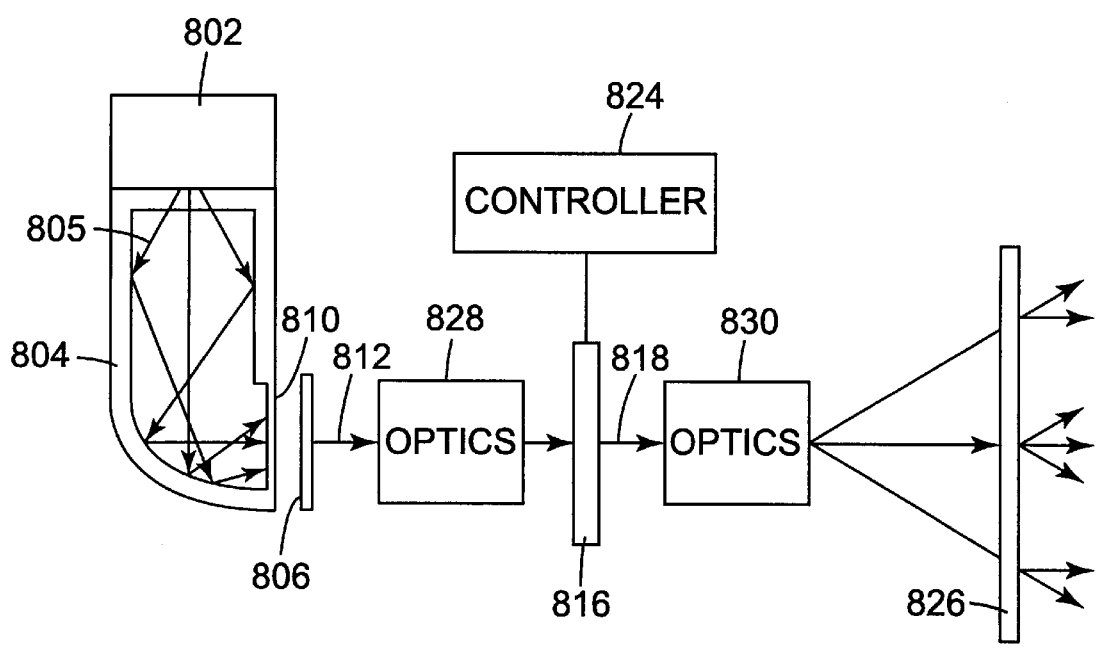
FIG. 8 illustrates a unitary diffusing cavity employed in a projection display system.

The diffuser may also be used in projection display applications, for example as shown schematically in FIG. 8. A light source 802 illuminates the cavity 805 of a diffuser 804. The light 812 output from the diffuser 802 is directed towards a display imaging device 816, for example a transmissive LCD display, as illustrated. It will be appreciated that other types of display imaging device may also be used. The display imaging device 816 is coupled to a controller 824 to receive modulation instructions for the particular image imposed on the illumination light 812 by the light image display device 816. The image light 818 produced by the image display device 816 is directed to a viewing screen 826 which disperses the image for viewing by a user.

A polarizer 806 may be disposed between the diffuser's transmitting screen 810 and the display imaging device to polarize the light 812 illuminating the display imaging device 816. Relay optics 828 may be used to relay the light 812 to the display imaging device 816. The relay optics 828 may include one or more lenses, mirrors, polarizing elements and the like. Furthermore, projection optics 830 may be used to project the image light 818 from the display imaging device 816 to the viewing screen 826. The projection optics 830 may include lenses, mirrors, polarizing elements and the like. The viewing screen 826 may be a rear projection screen, as shown, or may be a front projection screen.

It will be appreciated that other illumination geometries may be employed, for example where the display imaging device 816 reflects the image, rather than transmitting the image.

The diffuser may also be used in other applications, such as signage and traffic signals. For example, the diffuser may be used in the illumination of signs displaying the name of a store, or advertising a particular product within a store. In a traffic signal application, the diffuser may be used with conventional incandescent light sources, or with monochromatic light sources, such as LEDs.

EXAMPLE

A unitary diffuser for use with a microdisplay, having a design similar to the diffuser 204 illustrated in FIG. 2, was fabricated by a one-step molding process using a high impact polystyrene loaded with $TiO_2$ particles at weight loadings of 2%, 3%, 4%, and 5%. The $TiO_2$ particles had an average diameter of around 0.2 $\mu$m, and was obtained from E. I. Du Pont de Nemours and Company as TI-PURE® $TiO_2$ powder. The thickness of the transmission screen was nominally around 250 $\mu$m, with an emitting area of about 3 mm×5 mm. The length of the diffuser was 4 mm, and the cavity wall thickness ranged between 1 mm and 2 mm. The light source was a three color LED assembly, Nichia NSPW series, placed close to the aperture into the diffuser cavity. The aperture had a diameter of around 3 mm. The light transmitted through the transmission screen appeared uniform to the eye, for all loading levels. A measurement of the uniformity made using camera image analysis showed that the brightness across the transmission screen varied by less than 10%, also for all loading levels.

While various examples were provided above, the present invention is not limited to the specifics of the illustrated embodiments. For example, the microdisplay in FIG. 2 may be re-arranged so that light passing out of the diffuser is initially transmitted by the beamsplitter 214, rather than being reflected. In this case, the light reflected from the imaging device may be reflected by the polarizing beamsplitter, rather than being transmitted. Furthermore, the projection display illustrated in FIG. 8 may employ optical elements and arrangements that are similar to those described above with regard to the microdisplay, and whose size and scale is appropriate for projection applications.

As noted above, the present invention is believed to be particularly applicable to illumination sources requiring a uniform, or substantially uniform, light output. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A light diffusing device, comprising:
   a unitary structure, formed from an optically diffusive material, defining a diffusing cavity, a portion of the unitary structure defining diffusely reflective walls and another portion of the unitary structure defining a diffusely transmitting screen, the diffusely reflecting walls having a thickness greater than a thickness of the diffusely transmitting screen.

2. A light diffusing device as recited in claim 1, wherein a substantial portion of the reflecting walls has a thickness greater than the thickness of the diffusely transmitting screen.

3. A light diffusing device as recited in claim 1, wherein the thickness profile of the transmitting screen is substantially uniform.

4. A light diffusing device as recited in claim 1, wherein the transmitting screen has a thickness profile selected to produce a desired output light brightness profile.

5. A light diffusing device as recited in claim 1, wherein the thickness of a portion of the walls is at least five times the transmitting screen thickness.

6. A light diffusing device as recited in claim 1, wherein the optically diffusive material is a polymer loaded with scattering particles.

7. A light diffusing device as recited in claim 1, further comprising masking on the transmitting screen so as to form a pattern on light transmitted through the transmitting screen.

8. A light diffusing device as recited in claim 1, further comprising a light source disposed to transmit light into the cavity.

9. A light diffusing device as recited in claim 8, wherein at least a portion of the light source is disposed within the cavity.

10. A light diffusing device as recited in claim 8, further comprising a display device disposed to receive light transmitted through the transmitting screen from the light source.

11. A light diffusing device as recited in claim 10, further comprising a reflective polarizer disposed between the transmitting screen and the display device.

12. A light diffusing device as recited in claim 1, further comprising a polarizer disposed to polarize light transmitted through the transmitting screen.

13. A light diffusing device as recited in claim 12, wherein the polarizer is disposed on an output surface of the transmitting screen.

14. A light diffusing device, comprising:
   a unitary structure, formed from an optically diffusive material, defining a diffusing cavity having an access aperture, a first portion of the unitary structure substantially diffusely reflecting and mixing light within the diffusing cavity and a second portion of the unitary structure substantially diffusely transmitting light from the diffusing cavity as a light output.

15. A device as recited in claim 14, wherein the second portion transmits the light output having a substantially uniform brightness profile.

16. A device as recited in claim 14, further comprising a light source to generate light, the light generated by the light source being coupled from the light source into the diffusing cavity.

17. A device as recited in claim 14, further comprising a light source having at least two light emitters emitting light into different light wavelength ranges, wherein the second portion transmits the light output having substantially homogenized color.

18. A device as recited in claim 14, wherein the second portion transmits the light output having a preselected brightness profile corresponding to a thickness profile of the second portion.

19. A device as recited in claim 14, wherein the light output illuminates an image display device and the image display device spatially modulates the light output with an image.

20. A device as recited in claim 19, further comprising a polarizer disposed between the second portion and the image display device to polarize the light output illuminating the image display device.

21. A device as recited in claim 19, further comprising a polarizing beamsplitter disposed between the second portion and the image display device to separate light of a first polarization illuminating the image display device from light of a second polarization, orthogonal to the first polarization, reflected by the image display device.

22. A device as recited in claim 19, further comprising image propagating optics to propagate the image from the image display device to a viewer.

23. An illuminated display device, comprising:
   a light source;
   a light diffuser formed from a first material and defining diffusely reflecting walls and a diffusely transmitting screen, the walls and transmitting screen formed as a unitary body and defining a diffuser cavity having an access aperture, a wall thickness being greater than a transmitting screen thickness; and
   a display imaging device disposed to impose an image on light received from the light diffuser;
   wherein light from the light source is diffusely reflected within the cavity and is diffusely transmitted through the transmitting screen to illuminate the imaging device.

24. A device as recited in claim 23, further comprising view-finding optics disposed to propagate the image to a user.

25. A device as recited in claim 23, further comprising a polarizer disposed to polarize light transmitted through the transmitting screen of the diffuser.

26. A device as recited in claim 25, wherein the polarizer is attached to an output surface of the transmitting screen.

27. A device as recited in claim 23, wherein the display imaging device is a liquid crystal display (LCD) imaging device.

28. A device as recited in claim 27, further comprising a reflective polarizer disposed between the diffuser and the LCD imaging device for separating light propagating towards the LCD imaging device from light reflected by the LCD imaging device.

29. A device as recited in claim 23, further comprising a controller coupled to the display imaging device to control the image imposed on the light by the display imaging device.

30. A device as recited in claim 23, further comprising a camera coupled to control the display imaging device, wherein the image imposed on the light received from the light diffuser corresponds to an object image received by the camera.

31. A device as recited in claim 23, further comprising a viewing screen disposed to receive the image from imaging device and to display the image to a viewer.

32. A device as recited in claim 31, further comprising projection optics disposed to project the image from the display image device to the viewing screen.

\* \* \* \* \*